United States Patent

Bowers, Jr.

[15] 3,665,108

[45] May 23, 1972

[54] MULTIPLEXING SYSTEMS

[72] Inventor: John O. Bowers, Jr., Maitland, Fla.

[73] Assignee: General Dynamics Corporation

[22] Filed: Oct. 20, 1969

[21] Appl. No.: 867,756

[52] U.S. Cl. ....................179/15 BL

[51] Int. Cl. ....................H04j 3/02

[58] Field of Search ....................179/15 A, 15 BL; 340/183

[56] References Cited

UNITED STATES PATENTS

| | | | |
|---|---|---|---|
| 2,980,861 | 4/1961 | Popowsky | 179/15 BL |
| 2,907,902 | 10/1959 | McIntosh | 340/183 UX |
| 3,059,228 | 10/1962 | Beck | 340/183 X |

*Primary Examiner*—Ralph D. Blakeslee
*Attorney*—Martin Lu Kacher

[57] ABSTRACT

A multiplexing system having high speed sampling capability, even in cases of high source impedance which would ordinarily cause errors which are a function of the source resistance and capacitance, is described. The system includes a plurality of commutator switches or gates which are connected in series with the sources. An operational amplifier is provided having a feedback path connected between the output and inverting input of the amplifier and including the series connected switches and sources. The direct input of the amplifier is connected to ground or some other voltage which is approximately equal to the return potential of the source. The output of the amplifier therefore is equal to the sampled voltage and the amplifier compensates for the errors in the sampled voltage which would be produced by charging effects in the source impedance when insufficient time is not allotted for settling due, for example, to a high rate of sampling.

10 Claims, 5 Drawing Figures

Patented May 23, 1972

3,665,108

4 Sheets-Sheet 1

INVENTOR.
JOHN O. BOWERS, JR.

BY

HIS ATTORNEY

INVENTOR.
JOHN O. BOWERS, JR.

BY [signature]

HIS ATTORNEY

INVENTOR.
JOHN O. BOWERS, JR.

BY

HIS ATTORNEY

INVENTOR.
JOHN O. BOWERS, JR.

BY

HIS ATTORNEY

MULTIPLEXING SYSTEMS

The present invention relates to sampling circuits, and more particularly to a high speed analog multiplexing system.

The invention is especially suitable for use in telemetry systems requiring high speed operation, that is where the input signals or sources must be sampled at a very high rate.

The speed of multiplexing systems is limited by the time required for the output data to settle to approximately its final value after the commutator or multiplexer switch has closed (usually 0.05 percent or better is desired). This commutator or multiplexer switch is usually a solid state analog gate circuit. The time interval required is referred to as the settling time. Settling time is a function of the capacitance presented by the gate and is also adversely affected by the impedance of the sources which are being sampled. The output capacitance of the commutator includes the capacitance of the analog gate circuits, stray wiring capacitance and a capacitance introduced by connectors and other terminations. The impedance of the analog source to be sampled, which adversely affects settling time, is the inherent resistance of the source and the inherent capacitance thereof. This source capacitance is the result of stray wiring capacitance (e.g. using shielded or twisted pairs that connect the source to the commutator). Also significantly adding to the source capacitance and resistance may be filters at the outputs thereof. The source impedance, as well as the output capacitance and resistance of the gates, present a charging circuit which prevents the sampled voltage from reaching approximately its final value until after the settling time.

The source capacitance is particularly troublesome, inasmuch as charging current upon sampling is transferred from the source capacitance to the output capacitance of the commutator which results in a step function of additional voltage which requires an even longer settling time to reach its final value. If sufficient settling time is not allotted, the error voltage which is produced is approximately equal to the value of the source voltage multiplied by the ratio of the output capacitance to the sum of the output capacitance and analog source capacitance. This error voltage generally can not be tolerated since it varies from analog source to analog source in accordance with the differences in the source impedances thereof. Also, it is a function of the previous sample value (cross talk) unless a special output switch is provided to discharge the multiplexer output capacity between samples. Thus, the error voltage can not merely be calibrated out of the final sampled values. While it may be possible to reduce the output capacitance by means of a buffer amplifier at each analog source input to the system, the expense of such amplifiers and the additional error which may be introduced therein make this approach unfeasible. Accordingly, the speed of multiplexing systems has been limited by the required settling time which must be allotted to compensate for the capacitances of the gate circuits and the sources themselves. Very high speed multiplexers which produce accurate PAM or digitized PAM (PCM) outputs have therefore not been feasible.

Accordingly, it is an object of the present invention to provide an improved multiplexing system wherein the foregoing difficulties and disadvantages are substantially eliminated.

It is a further object of the present invention to provide sampling circuits capable of operating at higher sampling speeds with greater accuracy in the sampled output than heretofore possible.

It is a still further object of the present invention to provide an improved high speed multiplexing system wherein errors in sampled outputs are substantially reduced, notwithstanding high sampling speeds and reduced settling time.

It is a still further object of the present invention to provide high speed sampling circuits as are useful in the commutators of time division multiplex systems in which limitations upon speed as have been imposed by source and output impedances, especially by source capacitance, is substantially eliminated.

It is a still further object of the present invention to provide improved high speed multiplexers in which settling time errors are substantially eliminated and which can be readily implemented at low cost.

Briefly described, a multiplexing system embodying the invention is capable of sequentially sampling a plurality of sources of analog signals. A commutator or gate circuit is provided for each of the sources. An amplifier is also provided. A feedback circuit from the output of the amplifier to the input thereof extends through the gate and the source. The output of the amplifier provides charging current to the output and source capacitances of the system. This charging current is therefore not provided by the source itself. Accordingly, the settling time which would have been required for the source to charge these capacitances is substantially eliminated.

More specifically, the amplifier may be an operational amplifier, the inverting input of which is connected to the return side of the source while the output of the amplifier is connected to the output side of the gate. The direct input of the amplifier (non-inverting) is connected to the reference ground of the multiplexer. This is usually the analog-to-digital converter reference ground in the case of PCM. The operational amplifier charges the output capacitance and source capacitance, rather than the source itself, and the output voltage of the amplifier quickly reaches the final value of the sample of the source voltage. Means may also be provided for neutralizing inherent capacitances between the electrodes of the gates and for discharging any stray return line capacitances in the feedback path prior to sampling. Accordingly, the invention is readily used in multi-channel and multi-tier high speed multiplexers.

The invention itself, both as to its organization and method of operation, as well as additional objects and advantages thereof will become more readily apparent from a reading of the following description in connection with the accompanying drawings in which.

Figure 1:
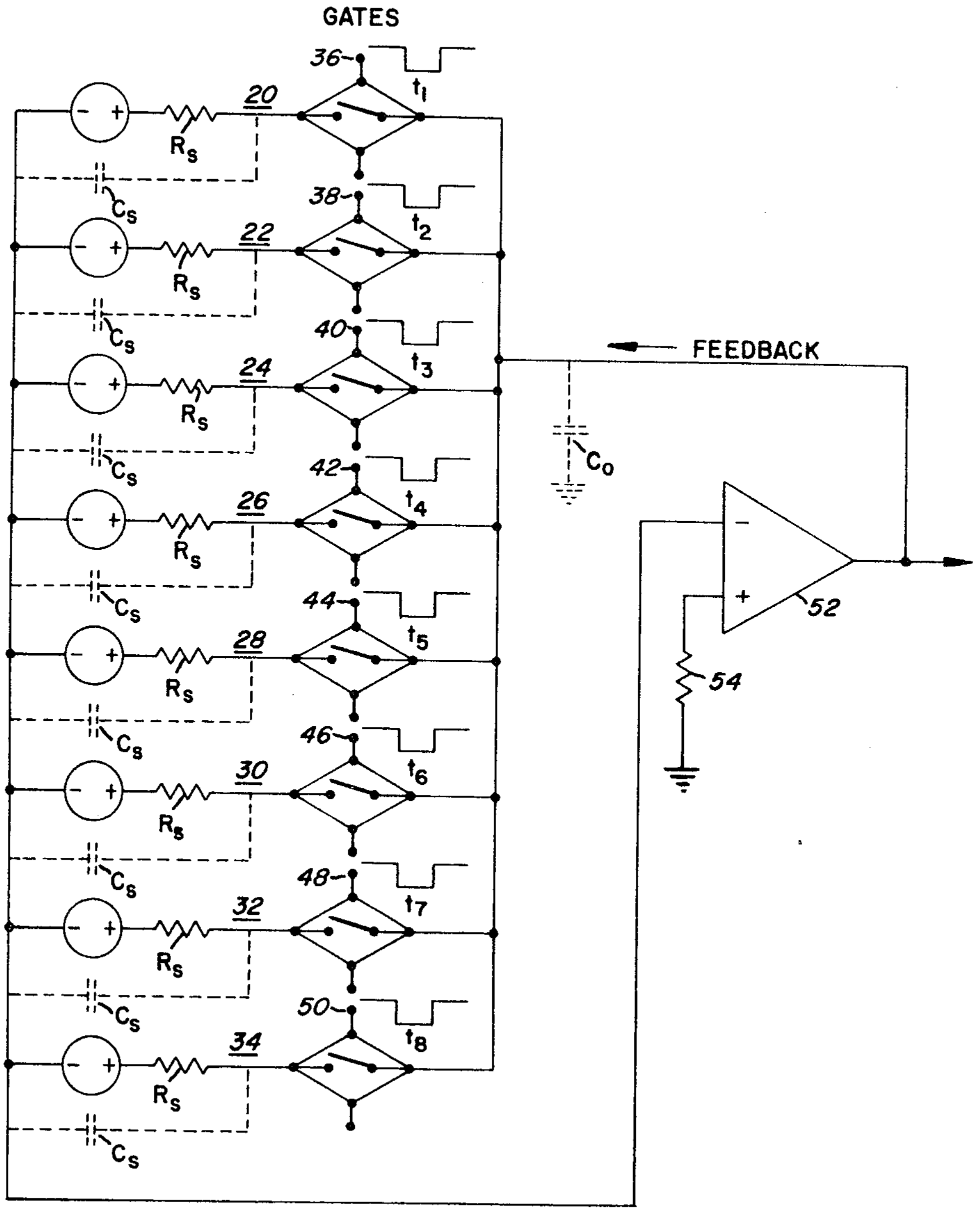
FIG. 1 is a schematic diagram of a multiplexing system embodying the invention.

Referring more particularly to FIG. 1, there is shown eight channels 20, 22, 24, 26, 28, 30, 32 and 34, each having a different source of analog signals. These signals may be transducer amplifier outputs or other analog devices which are to be sampled successively, the output samples to be provided to a PAM telemetry system or to an analog-to-digital converter so as to provide digitized outputs which may be telemetered to a receiving point via PCM telemetry techniques. The terminal of the sources which are at system ground or reference potential are indicated by the − while the other terminals, nominally the high potential side of the sources, are indicated by the +. Each source has internal or source resistance $r_s$ and internal source capacitance $c_s$. The source resistance and capacitance represents the source impedance and may vary from source to source, different types of sources being utilized in the system.

Each channel includes a gate, illustrated schematically as a single pole single throw switch which is connected in series with the source for its respective channel. The gates have command input terminals 36, 38, 40, 42, 44, 46, 48 and 50. Command pulses indicated in the drawing as occurring at times $t_1$ through $t_8$ are applied to the command terminals 36 to 50 so as to sequentially close the gates and provide successive and sequential samples of the output voltages of the analog sources in each of the channels 20 to 34. The inherent output capacitance presented by these gates, together with the internal wiring capacitance of the circuits, terminations and the like is represented as $c_0$. In the event that the voltage of the sources would be required to charge the internal capacitance $c_0$ and $c_s$, a settling time determined by the time constant $r_s$ multiplied by the sum of $c_s$ and $c_0$ would be required. This time constant assumes that the internal resistance of the gates is negligible as compared to the resistance $r_s$.

To show how this settling time adversely affects the speed of operation of the multiplexer, consider the case where $c_s$ is negligible, $r_s = 10K$ ohms, the internal resistance of the gate is equal to 1K ohm and the output capacitance $c_0$ is equal to 100 pf. The settling time constant is then $11 \times 10^3 \times 10^{-10} = 1.1 \times 10^{-6}$. If settling to 0.01 percent of the final value is required before the sampled voltage is encoded, 9.2 times constants or 10.1 microseconds is required. Not allowing for this settling time introduces a significant error in the sampled voltage. In cases where the source capacitance $c_s$ is greater than the output capacitance $c_0$, the settling time is very much longer. Unfortunately, the latter relationship is normally the case. For example, $c_s$ due to a 4 foot length of shielded input line from the source to the gate introduces a capacitance of 100 pf or more.

The present invention has as one of its features the reduction of the charging time by eliminating the need for the source to charge the output capacitance $c_0$ or to flow through $c_s$. An amplifier 52 is provided. This amplifier is desirably a wide band DC amplifier of the operational amplifier type. The integrated circuit amplifier sold by Radiation, Inc. of Melbourne, Fla., their Model RA 2909, is suitable. Other types of wideband difference amplifiers in integrated or discrete circuit form will also be suitable. The amplifier has direct and inverting input terminals respectively shown by + and − symbols in the drawing. The output of the amplifier provides the sample data output which can be connected to a sample and hold circuit, analog-to-digital converter or other components of a telemetry system. The reference (+) of the amplifier 52 is returned to reference ground through a resistor 54 of value chosen to match the nominal or average value of source resistance $r_s$. This minimizes voltage offset error due to input current drift in the amplifier 52. The regulating action of the amplifier 52 drives the return side of the analog sources (− input to the amplifier 52) to level of the reference ground with only a difference equal to a very small error voltage.

A feature of the invention is that it can be implemented with no more components than are normally provided in multiplexing systems. It will be noted, however, that the output of the amplifier is connected to the output side of the gates and the various channels 20 to 34, rather than the input terminals of the amplifier 52. Accordingly, the charging current for the output capacitance $c_0$ is provided by the amplifier 52. In other words, the charging currents due to the source and to the amplifier are in bucking relationship and effectively cancel each other out. The closed loop regulating action of the amplifier 52 drives the inverting input of the amplifier to ground reference level plus the small error voltage (i.e. 1–2 m.v. typically). The amplifier output is therefore equal to the value of the analog sample taken at the time one of the gates closes (viz. $t_1$ to $t_8$). Settling time of the system is principally a function of the bandwidth of the operational amplifier 52. It is therefore desirable that the amplifier have a relatively wide bandwidth. It has been found that in spite of large values of source capacitance $c_s$ and output capacitance $c_0$, the settling time is virtually independent thereof and in practice will be less than 10 microseconds. Since the output of the multiplexer is also the output of the amplifier, the system has a low value of output impedance which is desirable when sample and hold and other telemetry circuits are used.

Figure 2:
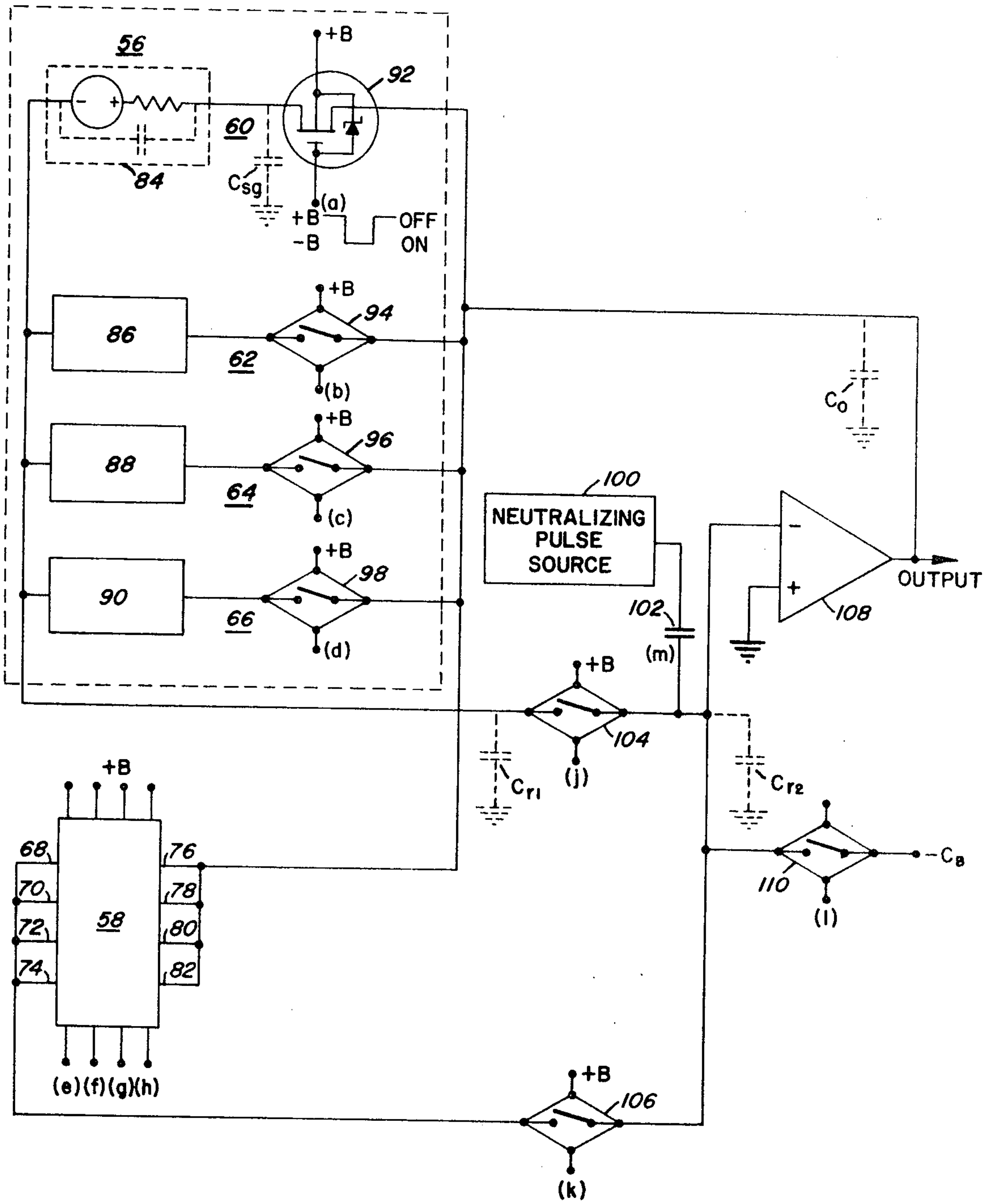
FIG. 2 is a schematic diagram of a multiplexing system in which a plurality of channels are grouped together in a plurality of groups which also embodies the invention.

FIG. 2 shows a multiplexing system having a plurality of groups of channels. Two such groups 56 and 58 are shown. Each group contains four channels. A first channel 60 in the first group 56 is shown in greater detail. The other three channels 62, 64 and 66 in the first group 58 are also shown. In the interest of simplifying the illustration, the four channels in the second group 58 are not illustrated, however, the return lines 68, 70, 72, 74 and the corresponding output sides 76, 78, 80 and 82 which correspond respectively to the same channels including the return side 68, 70, 72 and 74 are illustrated. Each of the channels includes an analog signal source 84, 86, 88 and 90 and a gate circuit 92, 94, 96 and 98. The gates are illustrated as P channel enhancement mode MOSFET devices. MOSFET is the acronym for Metal Oxide Semiconductor Field Effect Transistor. Other gates, such as junction field effect transistor (JFET) switches, bi-lateral transistor switches, and diode switches also are suitable. The MOSFET gate 92 is illustrated as having source to gate capacitance $c_{sg}$. The drain to gate and drain to body internal capacitances form part of the output capacitance $c_0$ of the system. This capacitance also reflects itself in the return line capacitance $c_{r1}$ which is shown at the common or interconnected return lines of the analog sources 84, 86, 88 and 90. The internal capacitance $c_{sg}$ of the MOSFET is generally very small, say 1 to 3 pf. However, the gate drive voltage which is applied to the gate terminal at the MOSFET may swing 20 to 30 (viz. from +B to −B), turning the MOSFET gate on when it is at −B. This voltage may introduce a slight error which is neutralized by pulses applied from a neutralizing pulse source 100 via a neutralizing capacitor 102 which is suitably of the same capacitance value as $c_{sg}$. This capacitor is connected at the return line of the group channels 56 and also serves to compensate for the internal capacitances which may similarly exist in the gate circuits in the group of channels 58.

The system as shown in FIG. 2 employs another gate 104 in the return line from the group 56 and similarly still another gate 106 in the return line from the other group of channels 58. The return line inherent capacitance for this other group is indicated as $c_{r2}$ the return line capacitance for the first group of channels 56 is indicated as $c_{r1}$. It will be noted that the number of analog sources sharing each return line is reduced from 8 to 4 when the embodiments of FIG. 1 and FIG. 2 are compared. This minimizes errors due to ground loop currents and the like. The gates 104 and 106 switch the return lines so that the gate 104 is closed when the group of channels 56 is sampled while the gate 106 is closed when the group of channels 58 is sampled. The return lines are connected to the inverting input of an operational amplifier 108, the output of which is connected to the output sides of each channel. The direct (+) input of the amplifier 108 is connected to system ground. The system including the amplifier 108 provides the feedback path relationships mentioned and discussed in connection with FIG. 1.

A shunt gate 110 is also provided. This gate is connected between the inverting input of the amplifier (viz. the common connection of the return lines at the output of the gates 104 and 106) and ground or a source of bias voltage, say approximately −0.05 volts which is indicated as $-c_B$ in the drawing. This gate 110 closes between samples, that is prior to the time a sample is taken by closure of the gates of each channel of both groups 56 and 58 of channels. This closure drives the output of the amplifier 108 towards a limiting condition (viz. a positive or negative voltage depending upon the bias voltage $-c_B$ and discharges any charge stored on the return line capacitances $c_{r1}$ or $c_{r2}$.

The neutralizing pulse source 100 applies a neutralizing pulse which is polarized to pass current in a direction along the return line toward the analog sources. This voltage pulse is slightly longer than the command pulse applied to the shunt gate 110 (viz. longer than the shunt gate closure period) and effectively bucks out the discharge of any voltage stored on the internal capacitance $c_{sg}$ of the gates 92, 94, 96 and 98 of the group 56 or any similar gates of the group 58.

Figure 3:
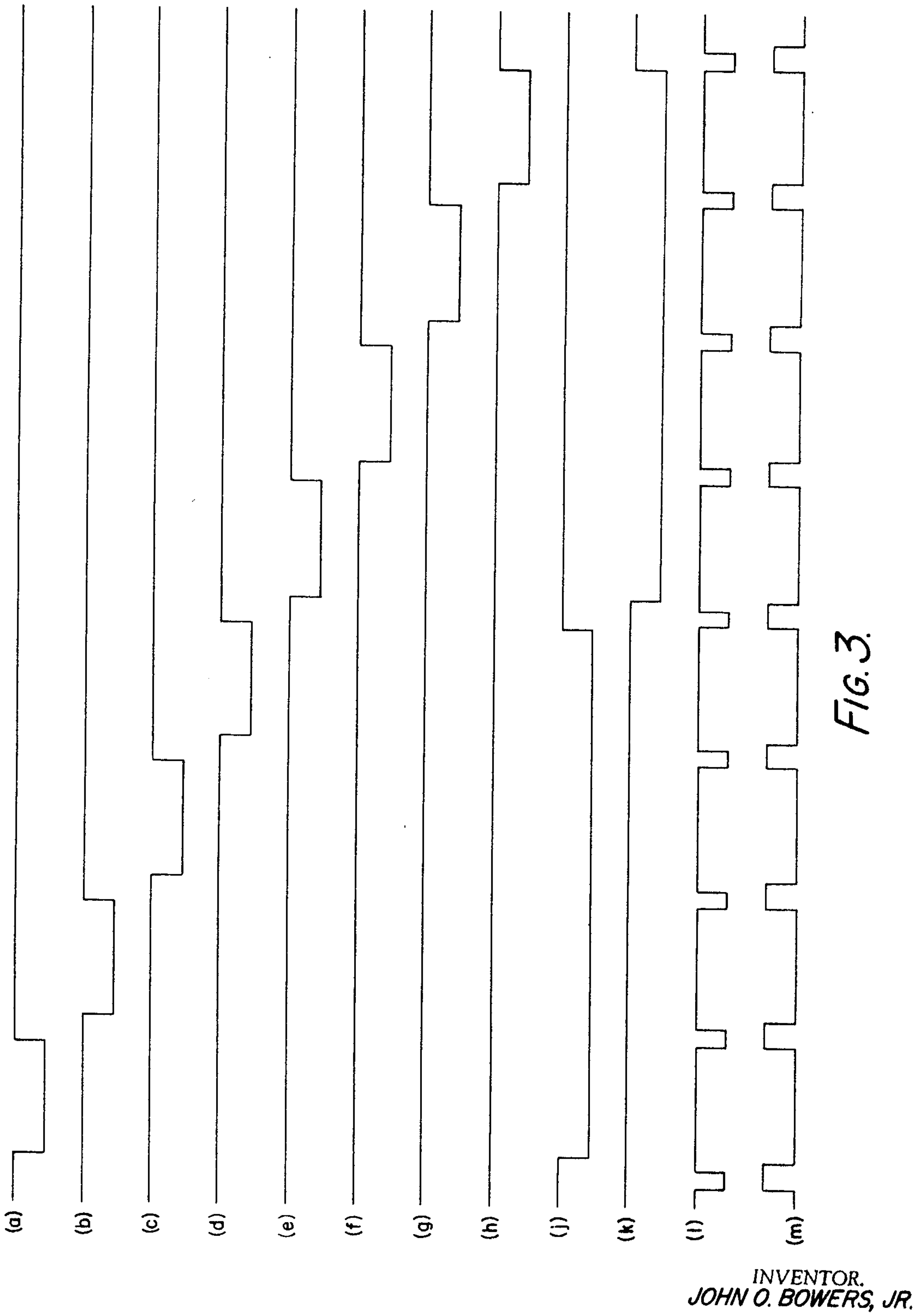
FIG. 3 is a timing chart which illustrates the operation of the system shown in FIG. 2.

The operation of the system shown in FIG. 2 will be more apparent from the timing chart of FIG. 3. The waveforms on the timing chart are indicated by letters which correspond to different lines in FIG. 2. Thus, waveforms *a*, *b*, *c*, *d*, *e*, *f*, *g* and *h* represent the command levels applied to the gates 92, 94, 96 and 98 in the group 56 and to the gates in the group 58. The gates will be closed during the time when these drive voltages are negative. The time where the gates 104 and 106 are negative is represented by the periods when their drive voltages are negative and these periods are also indicated by waveforms *j* and *k* in FIG. 3. Inasmuch as the return lines of the group 56 is open during the sampling periods for the channels in the group 58 that the group 56 does not interfere with the operation of the group 58. Similarly, gate 106 is open while gate 104 is closed, therefore the channels in group 58 are independent of the channels in the group 56. The shunt gate is opened, as indicated by waveform 1, except for a short period of time prior to each gate closure. The neutralizing pulse indicated on waveform *m*, extends slightly beyond the termination of the closure of the shunt gate 110. Accordingly, a short sharp current pulse flows in the direction to buck out any charging current flow due to the inherent capacitances $C_{sg}$. It will be noted that inasmuch as the gates 104 and 106 are closed during the neutralizing pulse period, the neutralizing pulse will flow to the requisite one of the closed gates 92 to 98 in the group 56 or through corresponding similar gates in the group 58. In other words, the reverse charging current that flows through the neutralizing capacitor 102 bucks out and compensates any charging current which may flow through the capacitance $C_{sg}$ of the various gate circuits when their respective gates are closed.

It will be noted further that the system operates on a "break before make" basis and that the shunt gate 110 prevents any improper readings at the output of the amplifier 102 during the period between break and before make.

Figures 4, 5:
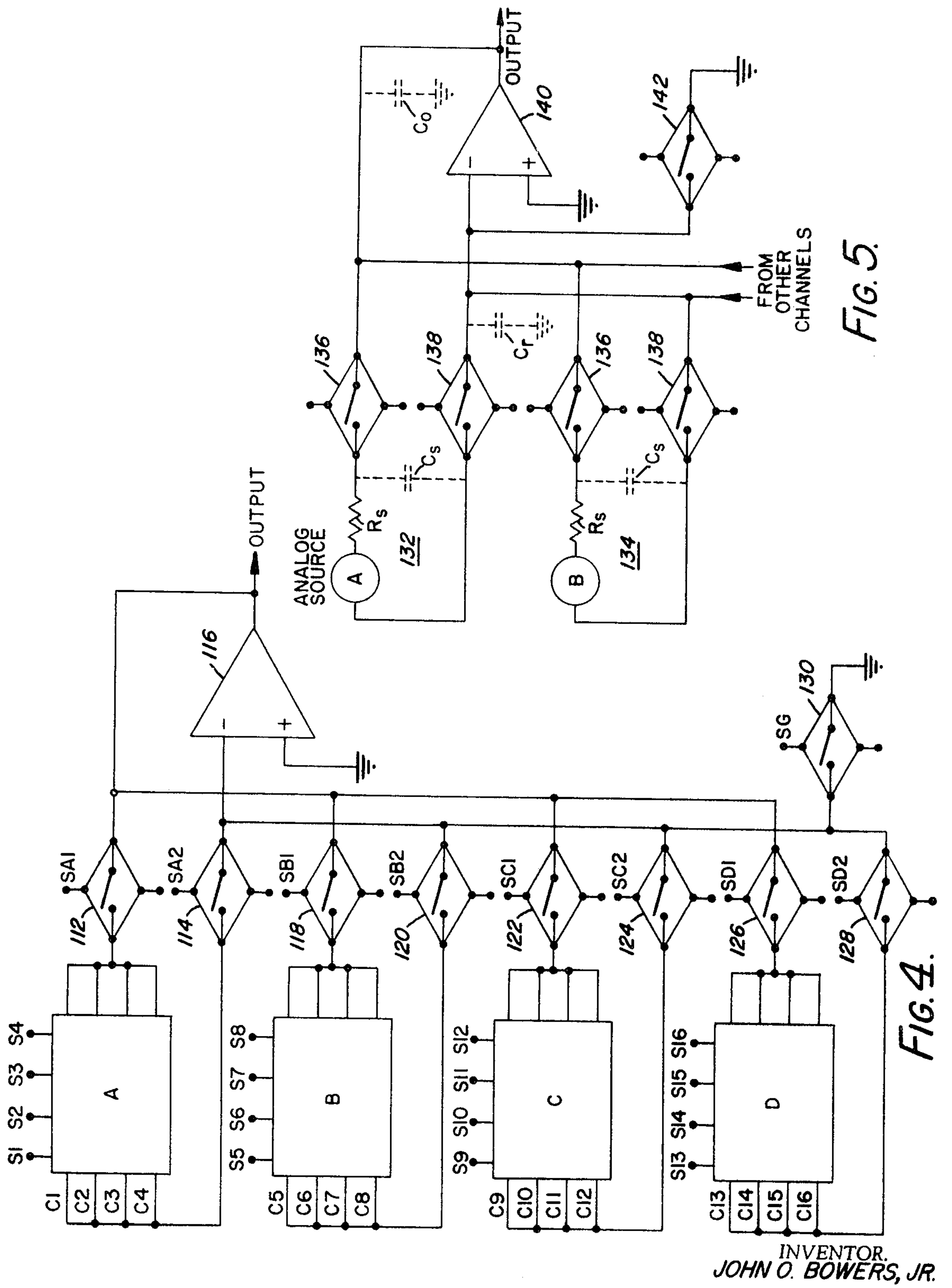
FIG. 4 is a schematic diagram of another multiple group or multi-tiered multiplexing system embodying the invention.
FIG. 5 is a schematic diagram of a multiplexing system employing double poled commutators for each channel and which also embodies the invention.

FIG. 4 illustrates another embodiment of the invention which arranges the analog gates in a multi-tiered configuration. Four groups of channels A, B, C and D, each having four channels C1 to C4 in the case of group A, C5 through C8 in the case of group B, C9 through C12 in the case of group C, and C13 through C16 in the case of group D are provided. Gating voltages for connecting the analog gates to the output sides of each channel are sequentially applied to terminals S1 through S16. Both return line and output capacitance are reduced by utilizing gates in both the output lines and return lines of each group channels. A gate 112 is therefore provided in the output line of the group A and a gate 114 is provided in the return line thereof. The gates 114 and 112 connect the output of an amplifier 116 and the inverting input thereof respectively to the output and return line of the group of channels A. A pair of gates 118 and 120 which are connected to the output in the return lines of the group B provide a similar function. Gates 122 and 124 are similarly provided for the group C and gates 126 and 128 are similarly provided for the group D. A shunt gate 130 connects the inverting input of the amplifier to ground. The gates 112 and 114 are simultaneously closed by command pulses applied to the command terminals SA1 and SA2 thereof.

After the channel $C_1$ through $C_4$ of group A have been sampled, pulses are applied to the drive terminals SB1 and SB2 of the gates 118 and 120. Thereupon, the sampling pulses are applied to terminals S5 through S8 and channels C5 through C8 in group B are sampled. Closures of the gates 122 and 124 and sampling of the channels in group C then follow. Finally, the gates 126 and 128 are closed and the channels C13 through C16 in group D are sampled. The shunt gate is closed prior to each sampling pulse as was heretofore explained in connection with FIG. 3. As noted above, the number of "open" gates or channels which are connected to the amplifier 116 and to the output of the system is reduced to four by reason of the multi-tiered arrangement and the pairs of gates. This reduces leakage current and increases the efficiency of operation of the system.

The output of the operational amplifier is connected to the output side of the various channels so that a current which flows from the output bucks the internal capacitance charging current due to the analog source voltages as was explained heretofore, thereby reducing settling time of the system.

Referring to FIG. 5, two channels 132 and 134 of the multichannel multiplexing system are shown, each provided with an analog source A and B, respectively. These sources have internal resistance $R_s$ and capacitance $C_s$ as was explained above. A pair of gates 136 and 138 are respectively provided in the output and return lines of the sources in each channel 134 and 132. The output and return lines are connected to the output and inverting terminals of an operational amplifier 140 to counteract the adverse effects of output capacitance $c_o$ and internal source capacitance $c_s$ as was explained above. A shunt gate 142 is also provided to discharge any return line capacitance $c_r$ between sampling pulses. Sampling pulses are applied to the pair of gates 136 and 138 in the channel 132, thereby connecting the output and return lines to the operational amplifier 140. The next sampling pulse is connected to the output and return line gates for the next channel 134. Sequentially, all of the other channels are sampled. This system permits all analog sources and channels to be isolated from each other.

From the foregoing description, it will be apparent that there has been provided an improved multiplexing system including improved sampling circuits. While various types of gates which have been discussed may be used in the practice of the invention, other gating systems including their respective drive circuits may also be incorporated. Reference may be had to U.S. Pat. No. 3,414,737 issued to John O. Bowers, Jr. on Dec. 3, 1968 for discussion of the types of gating circuits which may be used in the practice of the invention and their gate drivers. It will be appreciated therefore that variations and modifications of the herein described systems, without departing from the spirit of the invention, will suggest themselves to those skilled in the art. Accordingly, the foregoing description should be taken merely as illustrative and not in any limiting sense.

What is claimed is:

1. A multiplexing system for sequentially sampling input signals from a plurality of source, each having a pair of terminals, one of which is at relatively low potential, which system comprises a. a gate circuit for each of said sources, b. a difference amplifier having a pair of inputs, one of which is connected to a point of reference potential, and c. a feedback circuit from the output of said amplifier to an input thereof having a plurality of separate feedback paths each including a different one of said sources and the gate circuit therefor in series therein, each of said paths having a connection between a different one of said sources and the output of said amplifier via said gate circuit therefor, and means for connecting the other of said pair of amplifier inputs to said one terminal of said last named source.

2. The invention as set forth in claim 1 wherein said amplifier is an operational amplifier, said other input being the direct input thereof, and said one input being the inverting direct input thereof.

3. The invention as set forth in claim 2 including a capacitor connected to said feedback path between said inverting input of said amplifier and said other terminals of said sources and means for applying pulses through said capacitor immediately prior to operation of each of said gate circuits from its open to its closed condition.

4. A multiplexing system for providing successive samples of the voltage output produced by a multiplicity of analog sources each having an output terminal and a return terminal, said system comprising a. a multiplexing of first gates each corresponding to a different one of said sources and connected in series therewith to the output terminal thereof, b. an operational amplifier having output, direct input and inverting input terminals, c. a plurality of second gates, d. said series connected sources being connected to said output terminal of said amplifier via said first gates, and said return terminals being connected to said inverting terminal of said amplifier via said second gates, e. said direct terminal of said amplifier being connected to the point of reference potential, the potential of said return terminals and said point of reference potential being driven to virtually equal potential by the regulation of the amplifier feedback network, and f. said samples being provided at said amplifier output terminal.

5. The invention as set forth in claim 4 including a third gate connected between said point of reference potential and said inverting terminal.

6. The invention as set forth in claim 4 wherein said series connected first gates and sources are connected in parallel with each other in a plurality of groups, each corresponding to a different one of said second gates such that the return terminals of the sources in different ones of said groups are connected to each other and the output sides of each of said first gates in said different ones of said groups are connected to each other, said output sides of said gates in each of said groups being connected to said amplifier output, and said connected return terminals of said sources in each of said groups being connected via the one of said second gates corresponding thereto to said inverting terminal of said amplifier.

7. The invention as set forth in claim 6 including a capacitor, and a source of neutralizing pulses connected to the connection between said return terminals and said inverting terminal via said capacitor.

8. The invention as set forth in claim 7 wherein said first gates are three terminal active devices having input, output and control terminals, said input terminals each being connected to said sources and said output terminals providing said output sides, and wherein said capacitor has a value of capacitance approximately equal to the inter-electrode capacitance between said input and control terminals.

9. The invention as set forth in claim 6 including a plurality of fourth gates each corresponding to a different one of said groups, said output sides of said first gates in different ones of said groups being connected via the one of said fourth gates corresponding thereto to said amplifier output.

10. The invention as set forth in claim 7 wherein said second gates equal said first gate in number and each of said second gates also corresponds to a different one of said first gates, said return terminals of said sources each being connected via its corresponding second gate to said inverting inputs of said amplifier.

* * * * *